United States Patent
Mikael et al.

(10) Patent No.: US 7,174,552 B2
(45) Date of Patent: Feb. 6, 2007

(54) METHOD OF ACCESSING A RESOURCE BY A PROCESS BASED ON A SEMAPHORE OF ANOTHER PROCESS

(75) Inventors: Mortensen Mikael, Lyngby (DK); Rene R. Larsen, Bagsvaerd (DK)

(73) Assignee: Intel Corporation, Santa Clara, CA (US)

(*) Notice: Subject to any disclaimer, the term of this patent is extended or adjusted under 35 U.S.C. 154(b) by 575 days.

(21) Appl. No.: 10/045,414

(22) Filed: Jan. 12, 2002

(65) Prior Publication Data

US 2003/0135537 A1     Jul. 17, 2003

(51) Int. Cl.
G06F 9/46 (2006.01)
(52) U.S. Cl. .................. 718/102; 718/103; 718/704
(58) Field of Classification Search ............. 718/100, 718/104, 1, 103, 102; 710/200, 220, 240–244
See application file for complete search history.

(56) References Cited

U.S. PATENT DOCUMENTS

| | | | | |
|---|---|---|---|---|
| 4,590,555 | A | * | 5/1986 | Bourrez .................. 718/103 |
| 4,672,536 | A | * | 6/1987 | Giroir et al. ............ 710/241 |
| 4,754,398 | A | * | 6/1988 | Pribnow .................. 709/226 |
| 5,293,491 | A | * | 3/1994 | Leung et al. ............. 710/28 |
| 5,367,690 | A | * | 11/1994 | Schiffleger .............. 711/213 |
| 5,506,972 | A | * | 4/1996 | Heath et al. ............. 710/113 |
| 5,615,167 | A | * | 3/1997 | Jain et al. ........... 365/230.08 |
| 5,748,969 | A | * | 5/1998 | Lee et al. ............... 710/244 |
| 5,920,714 | A | * | 7/1999 | Schiffleger .............. 712/241 |
| 6,073,132 | A | * | 6/2000 | Gehman .................... 707/9 |
| 6,131,094 | A | * | 10/2000 | Gord ........................ 707/8 |
| 6,134,579 | A | | 10/2000 | Tavallaei et al. |
| 6,170,018 | B1 | * | 1/2001 | Voll et al. .............. 719/330 |
| 6,237,019 | B1 | * | 5/2001 | Ault et al. .............. 718/104 |
| 6,243,793 | B1 | * | 6/2001 | Aucsmith et al. ......... 711/151 |
| 6,263,425 | B1 | * | 7/2001 | Falik ..................... 712/228 |
| 6,353,869 | B1 | * | 3/2002 | Ofer et al. .............. 710/200 |
| 6,493,805 | B2 | * | 12/2002 | Nieuwland et al. ........ 711/152 |

(Continued)

FOREIGN PATENT DOCUMENTS

EP    0 012 016    6/1980

(Continued)

OTHER PUBLICATIONS

International Search Report, EPO, PCT/US/03/00659, date of mailing Sep. 9, 2004.

(Continued)

Primary Examiner—Chun Cao
Assistant Examiner—Malcolm Cribbs
(74) Attorney, Agent, or Firm—Blakely, Sokoloff, Taylor & Zafman LLP

(57) ABSTRACT

A method and apparatus are described for a semaphore system based on process events. The system may have multiple processes; one or more shared resources; and a semaphore system corresponding to each of the processes. When multiple processes simultaneously request access to a given shared resource, each semaphore system arbitrates on behalf of its corresponding process. In one embodiment, a semaphore system is self-contained and can arbitrate for its corresponding process based on the other process's events. In another embodiment, the semaphore system interacts with a global arbiter to resolve conflicts.

23 Claims, 15 Drawing Sheets

U.S. PATENT DOCUMENTS

| | | | |
|---|---|---|---|
| 7,036,125 B2* | 4/2006 | Basso et al. | 718/104 |
| 2002/0199057 A1 | 12/2002 | Schroeder et al. | |
| 2003/0061259 A1* | 3/2003 | Heddes et al. | 709/102 |

FOREIGN PATENT DOCUMENTS

| | | |
|---|---|---|
| EP | 0012016 | 6/1980 |
| EP | 0 121 030 | 10/1984 |
| EP | 0121030 | 10/1984 |
| EP | 0 543 560 | 5/1993 |
| EP | 0543560 A2 | 5/1993 |
| WO | WO 00/43895 | 7/2000 |
| WO | WO 0043895 | 7/2000 |

OTHER PUBLICATIONS

Lakshmi Narasimhan V. et al. "Analysis and Simulation of Six Bus Arbitration Protocols", Microprocessing and Microprogramming, Elsevier Science Publishers, BV., Amsterdam.

Narasimhan, V.L., et al., "Analysis and Simulation of Six Bus Arbitration Protocols," Microprocessing and Microprogramming 38 (1993) pp. 665-662.

* cited by examiner

METHOD OF ACCESSING A RESOURCE BY A PROCESS BASED ON A SEMAPHORE OF ANOTHER PROCESS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2001, Intel Corporation, All Rights Reserved.

FIELD OF THE INVENTION

The invention relates generally to parallel processes, and more particularly, to semaphores for managing access to shared system resources.

BACKGROUND OF THE INVENTION

Systems that perform parallel processing comprise simultaneously executing processes. A common problem when using parallel processing is protecting the contents of a common resource.

One known way to implement this is to use a semaphore, which is generally a hardware or software flag. In multitasking systems, a semaphore is a variable that indicates the status of a common resource. It is used to lock the resource that is being used. A process needing the resource checks the semaphore to determine the resource's status and then decides how to proceed. A semaphore indicates to other potential users that a file or other resource is in use and prevents access by more than one process.

However, when multiple processes need access to a common resource, problems such as starvation and/or deadlock may occur. Starvation occurs when one or more processes are prevented from accessing the common resource, and deadlock may occur when one or more processes lock each other, thereby stopping execution.

This is further complicated when there are multiple resources. The classical approach to solving this problem is to implement a semaphore for each resource. However, when the number of resources becomes very large, this solution is not very effective.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In one aspect of the invention is a method for a fairness-based semaphore system for managing access to shared system resources. The method comprises requesting a resource, and then determining if that resource is being requested by another process, or if that resource is locked by another process. If it is being requested by another process, then the resource is given to the process having a higher priority. If the resource is locked by another process, then the process is not granted access to the resource.

In variations and different embodiments, the semaphore system may comprise and use any combination of a timer element and a global arbiter having a global priority block.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions.

Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Introduction

Figure 1:
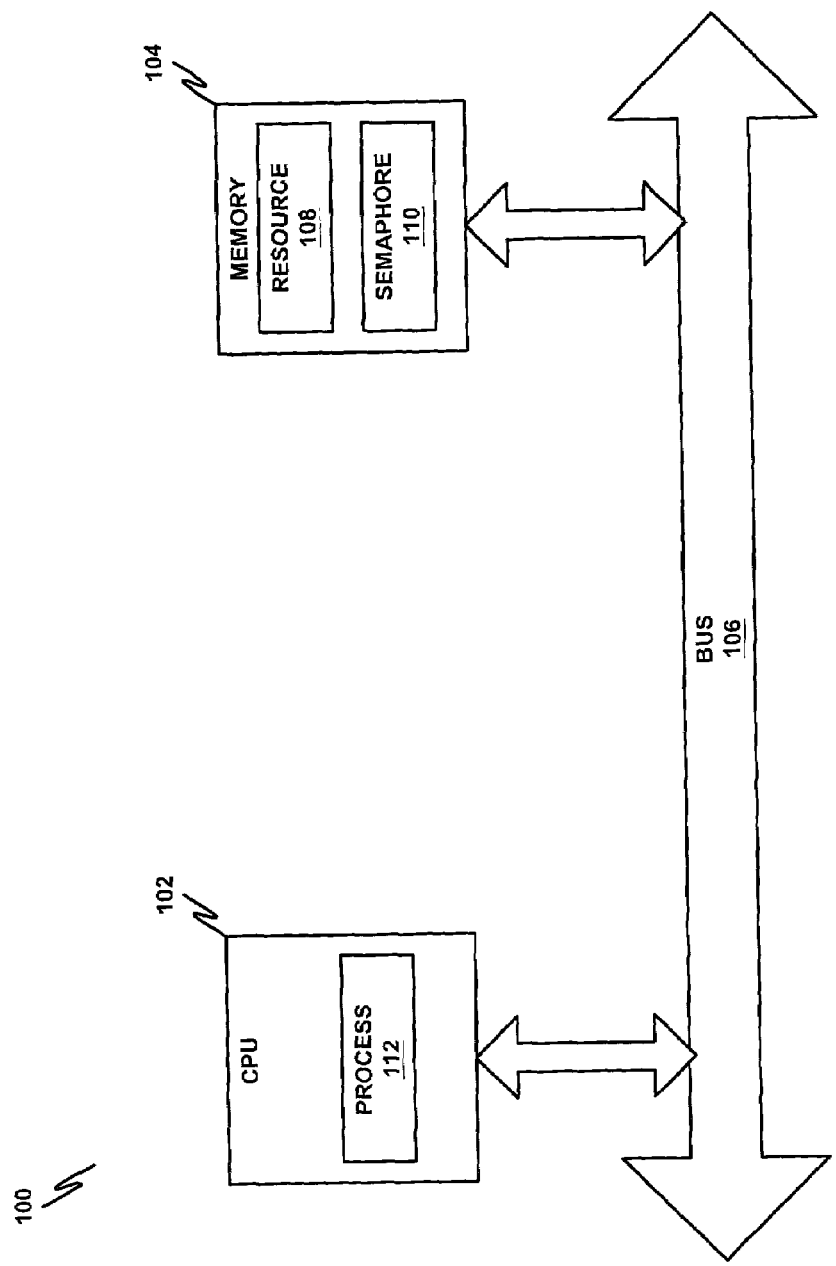
FIG. 1 is a block diagram illustrating a system architecture in accordance with general embodiments of the invention.

FIG. 1 illustrates a system 100 in which embodiments of the invention may be implemented. It comprises at least one CPU (central processing unit) 102 (only one shown), at least one memory 104 (only one shown), and a bus 106 through which the CPU 102 and memory 104 interact. The memory 104 comprises a plurality of resources 108 (only one shown), and a plurality of semaphores 110 (only one shown), and the CPU 102 comprises a plurality of processes 112 (only one shown).

Figure 2:
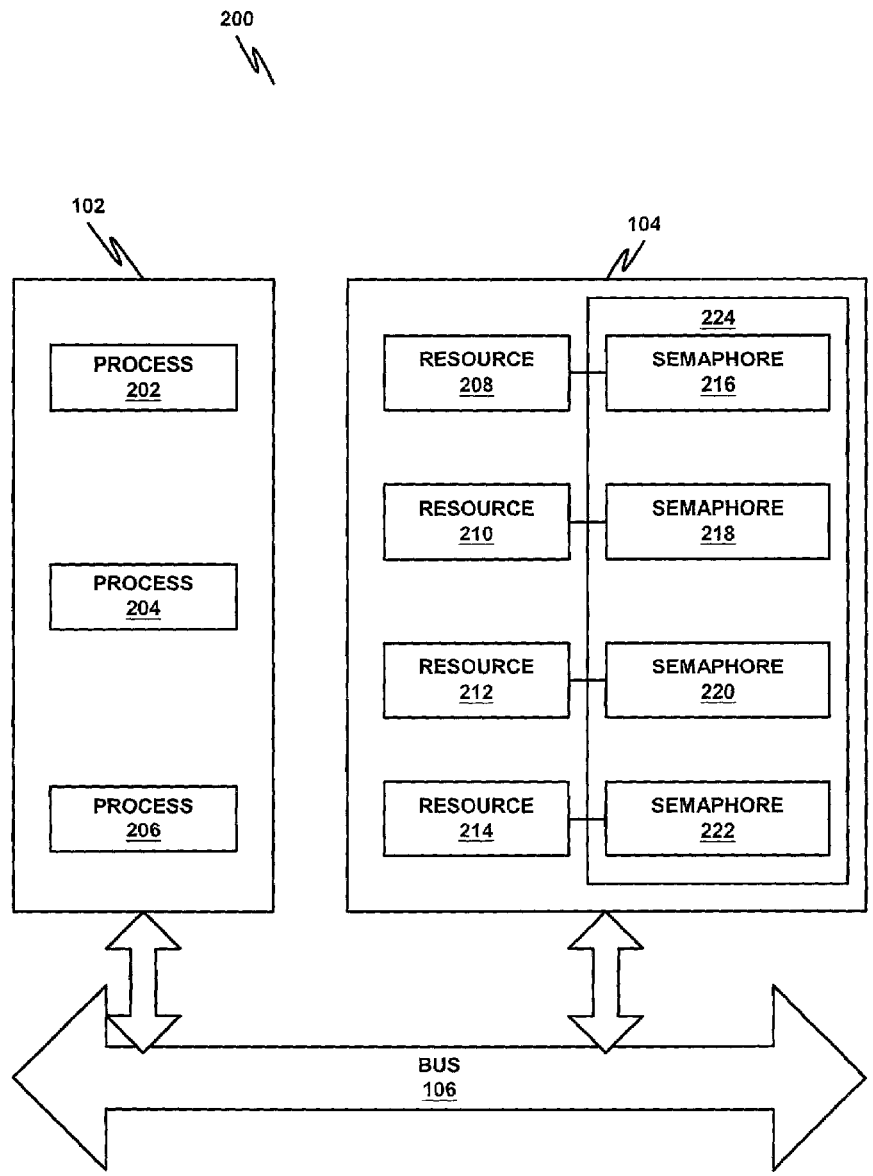
FIG. 2 is a block diagram illustrating a prior art system for using semaphores.

FIG. 2 illustrates a prior art system 200 that that may be implemented in the system 100 of FIG. 1. In the system 200, the CPU 102 comprises a plurality of processes 202, 204, 206, and plurality of resources 208, 210, 212, 214, where each resource 208, 210, 212, 214 has a corresponding semaphore 216, 218, 220, 222 for managing shared access to the resources 208, 210, 212, 214. Alternatively, each resource 208, 210, 212, and 214 may correspond to the semaphore functionality of semaphores 216, 218, 220, 222 represented by a single semaphore object 224, rather than as separate semaphore objects 216, 218, 220, 222.

In a prior art embodiment, when a first process 202, 204, 206 wants to access a resource 208, 210, 212, 214, the first process 202, 204, 206 checks the status of the desired resource 208, 210, 212, 214 by sending a read command over the system bus 106 to the resource's 208, 210, 212, 214 corresponding semaphore 216, 218, 220, 222. If the desired resource 208, 210, 212, 214 is available, then the first process 202, 204, 206 sends a write command to the corresponding semaphore 216, 218, 220, 222 to change the status of the semaphore 216, 218, 220, 222 from unlocked to locked.

In embodiments of the invention, a system is described in which semaphores are associated with a process rather than a resource. When a semaphore is locked, it indicates the unavailability of a specified resource for the semaphore's corresponding process. When the semaphore is unlocked, it indicates that its corresponding process is not currently using any resource.

The semaphore may be changed by the occurrence of one or more events associated with its corresponding process. A semaphore system detects the occurrence of these events and controls the status of the semaphore. In one embodiment, the semaphore systems are self-contained in that a first semaphore system arbitrates on behalf of a first process by communicating with a second semaphore that arbitrates on behalf of a second process. In another embodiment, the semaphore systems arbitrate for their respective processes, but are dependent upon a global arbiter for conflict arbitration processing. These embodiments are further described below.

Self-Contained Semaphore

Figure 3:
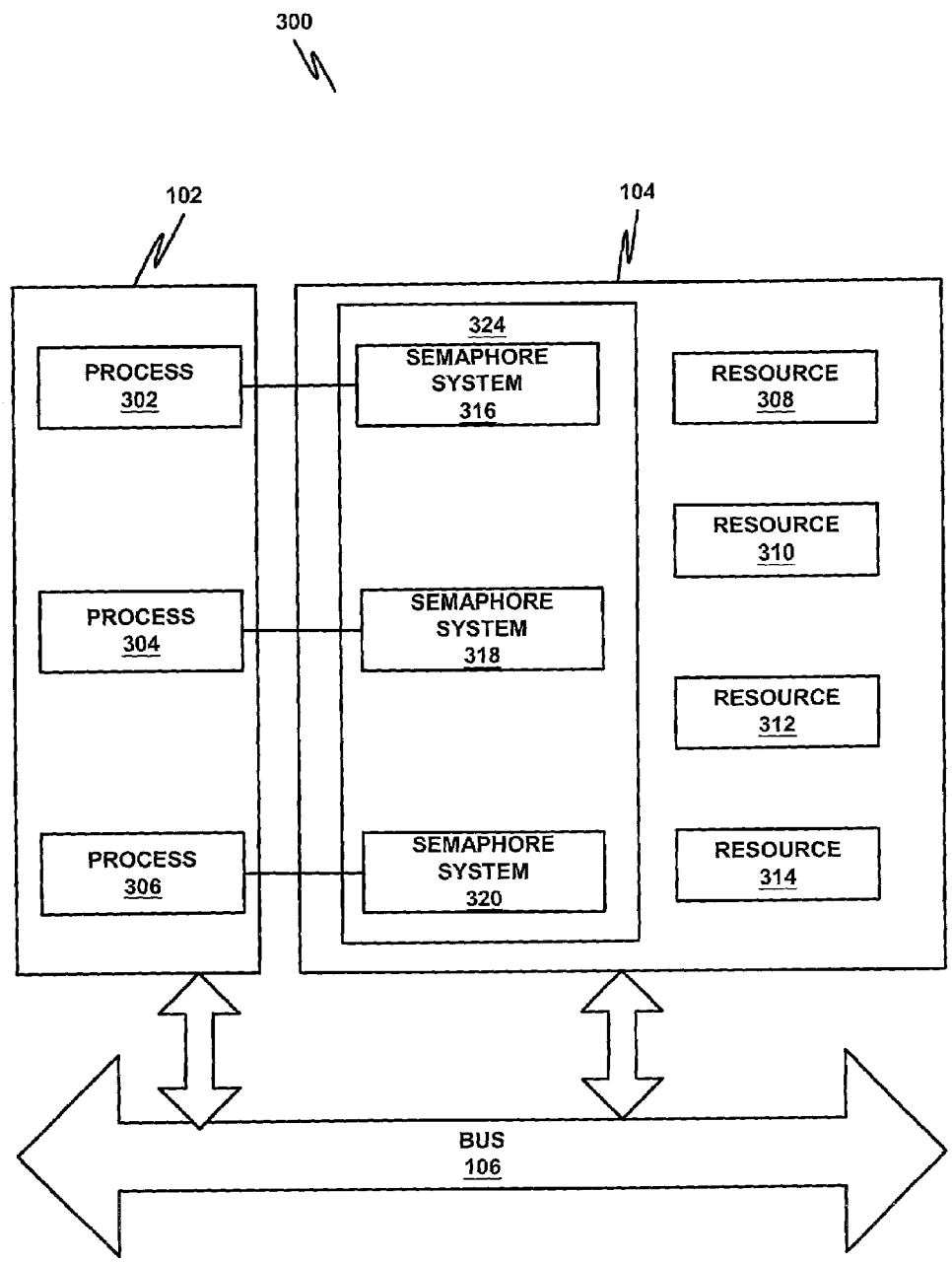
FIG. 3 is a block diagram illustrating a system having self-contained semaphore system in accordance with embodiments of the invention.

In one embodiment of the invention, as illustrated in the system 300 of FIG. 3, the CPU 102 comprises a plurality of processes 302, 304, 306, and the memory 104 comprises a plurality of resources 308, 310, 312, 314, and semaphore system 316, 318, 320. In the system 300, each process 302, 304, 306 has a corresponding semaphore system 316, 318, 320 for managing shared access to the resources 308, 310, 312, 314. Alternatively, a single semaphore system 324 can be shared by all processes.

In the descriptions below, processes 302, 304, semaphore systems 316, 318, and resource 308 are depicted to illustrate the arbitration process for two processes and their corresponding semaphore systems for a given resource 308. However, one of ordinary skill in the art would understand that the descriptions apply process 306, semaphore system 320, and resource 310, 312, 314, and any other processes, semaphore systems, and resources that may be defined, but are not illustrated or discussed herein.

Semaphore Comprising Local Priority Block

Figure 4:
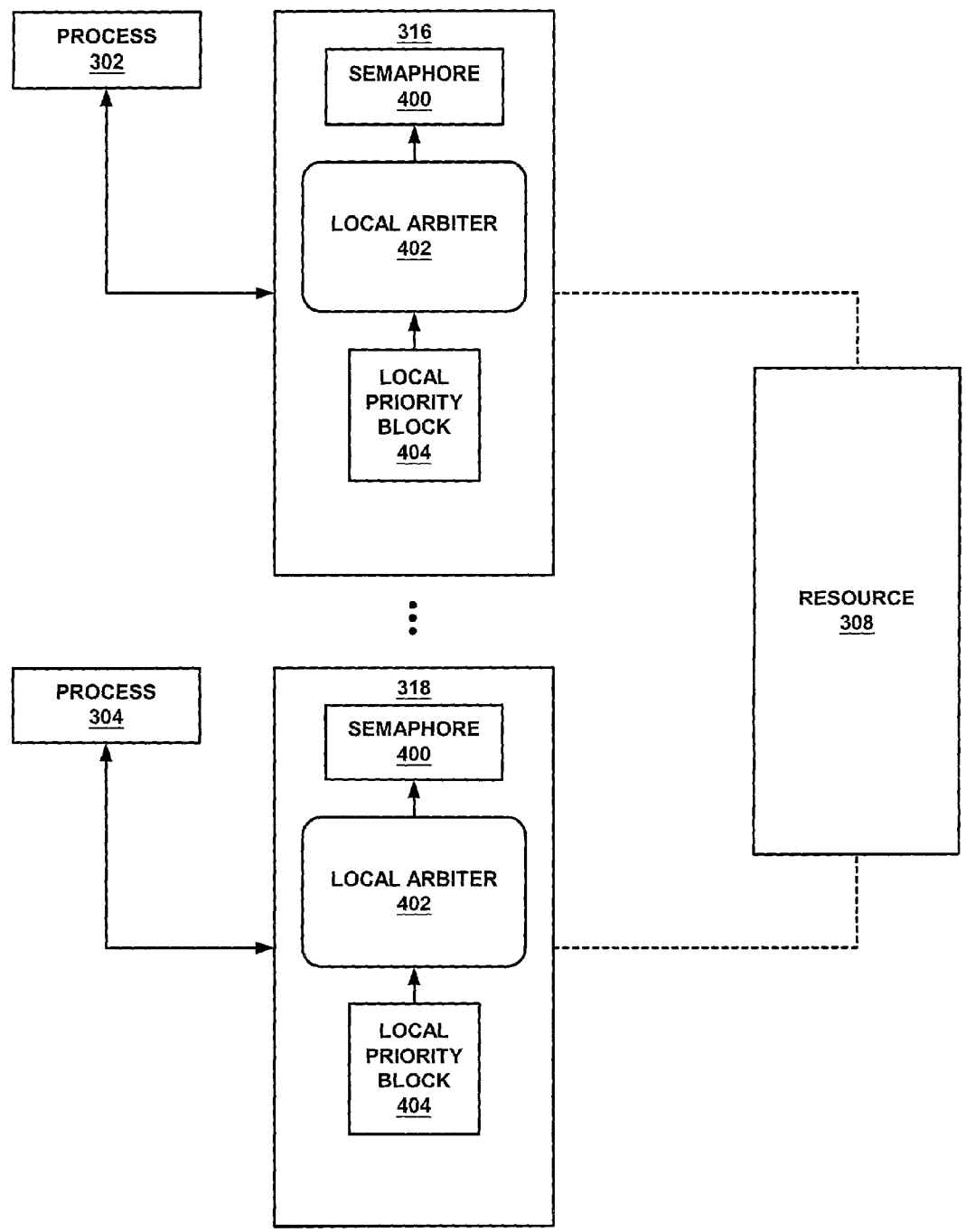
FIG. 4 is a block diagram illustrating a self-contained semaphore system in one embodiment of the invention.

FIG. 4 illustrates processes 302, 304 having corresponding semaphore systems 316, 318. Each of the semaphore systems 316, 318 comprises a semaphore 400 to indicate the availability or unavailability of a resource, and a local arbiter 402 that arbitrates for access to a given resource 308 on behalf of its corresponding process 302, 304 by monitoring events of its corresponding process 302, 304 to determine the status of the semaphore 400.

In one embodiment, a semaphore system 316, 318 may additionally comprise a local priority block 404 that has a fixed priority for its corresponding process 302, 304. Each process 302, 304 is assigned a fixed priority that gives a first process higher or lower priority than a second process. If more than one process 302, 304 requests the same resource 308 the local arbiter 402 resolves the conflict by giving the resource 308 to the process 302, 304 with the higher priority. For example, of process P1 has priority=1 and process P2 has priority=2, where 1 is a higher priority than 2, then if processes P1 and P2 simultaneously request a given resource R, the local arbiter 402 will grant process P1 resource R because P1 has a higher priority than P2.

Figure 5:
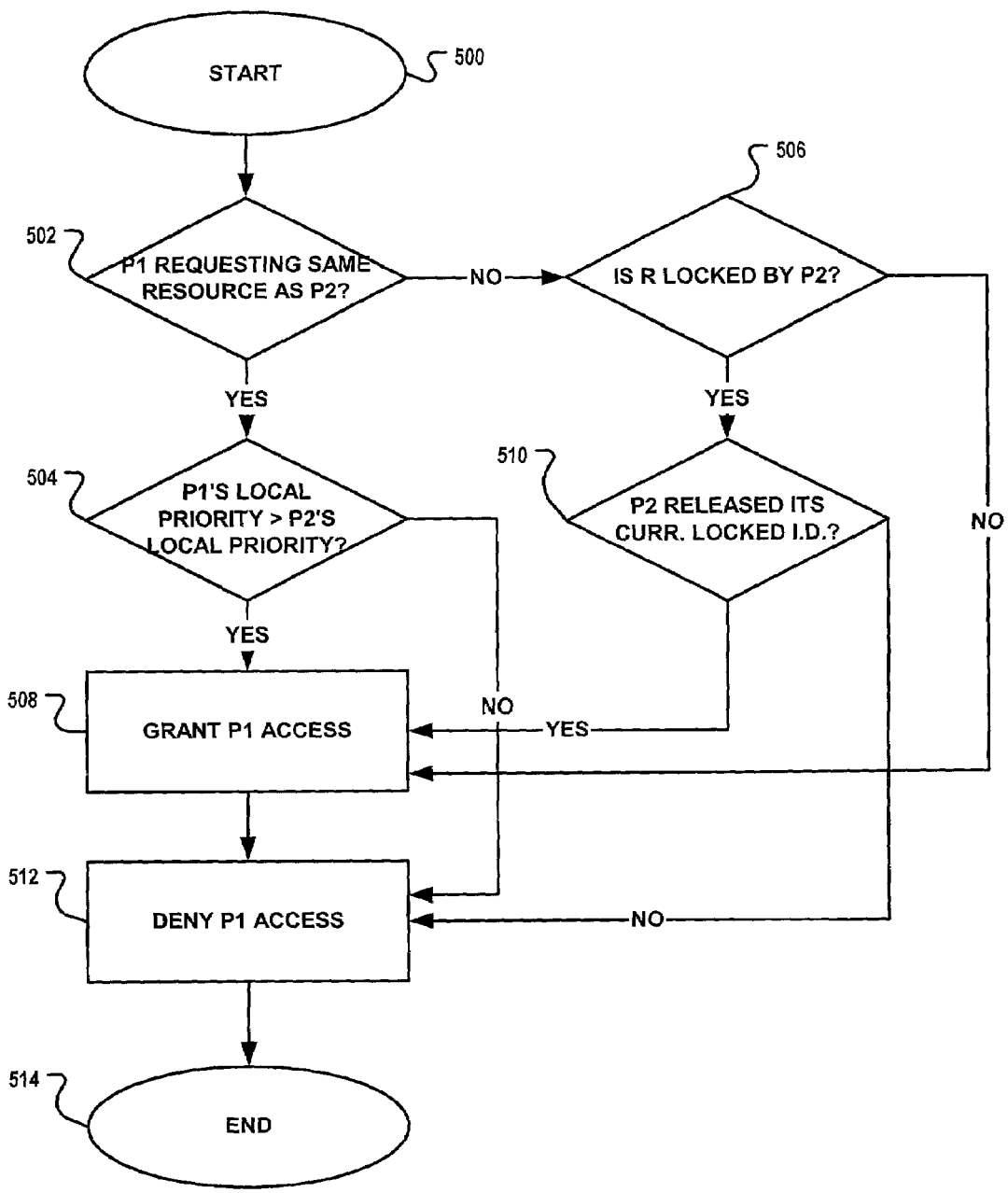
FIG. 5 is a flowchart illustrating a method for using the self-contained semaphore system of FIG. 4.

FIG. 5 illustrates a method of the above-described embodiment. It starts at block 500 and continues to block 502 where it is determined if there is a conflict between process P1 and process P2 over a resource R (i.e., does P1's request I.D. equal P2's request I.D.?). If there is a conflict, then it is determined if P1's local priority is greater than P2's local priority at block 504. If P1's local priority is greater than P2's local priority, then access is granted to P1 at block 508. Otherwise access is denied to P1 at block 512.

If there is no conflict, then it is determined if the resource R is locked by P2 (i.e., if P1's request I.D. does not equal P2's request I.D., then does P1's request I.D. equal P2's currently locked I.D.?) at block 506, and if P2 has released its lock on R at block 510. If R is locked by P2, and P2 has released its lock on R, then access to resource R is granted to P1 at block 508. If R is locked and P2 has not released its lock on R, then P1 is denied access to R at block 512. If there is no conflict, and the resource R is not locked by P2, then access to resource R is granted to P1 at block 508. The method ends at block 514.

Semaphore Comprising Local Arbiter Plus Timer Element

Figure 6:
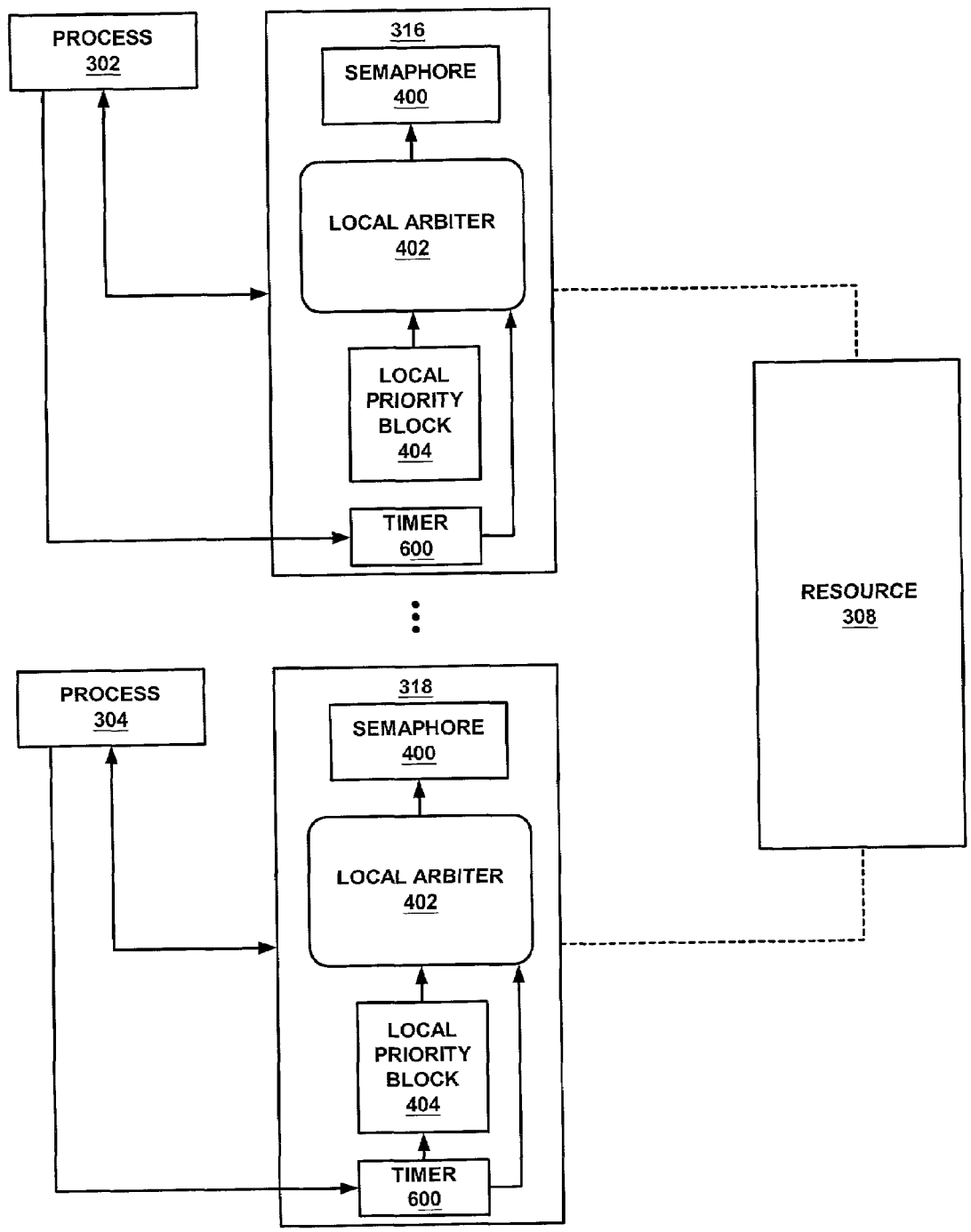
FIG. 6 is a block diagram illustrating a self-contained semaphore system having a timer element in another embodiment of the invention.

In yet another embodiment, as illustrated in FIG. 6, a semaphore system 316, 318 may comprise the local arbiter 402, plus a timer element 600. Each semaphore system 316, 318 may comprise a local priority block 404, as discussed above, as well as a timer element 600 that keeps track of the time that its corresponding process 302, 304 has waited for a given resource 308 without locking its semaphore.

In one embodiment, the timer 600 is purely time-based, where it counts the number of clock cycles that have passed since the request for a lock was given. In another embodiment, the timer 600 is a counter that determines which other processes have been granted access to the same shared resource as the one its corresponding process is requesting. In the latter embodiment, the timer 600 is incremented every time another process is granted access, and reset (for example, to 0) when its own process is granted access.

In this embodiment, the local arbiter 402 grants a first process access if it has been waiting longer than a second process. For example, if the process P1 having priority=1 has been waiting longer than a process P2 having priority=2, then the local arbiter grants process P1 access. If process P2 has been waiting longer than process P1, then the local arbiter grants process P2 access. If both processes have been waiting an equal amount of time, then the local arbiter determines which process has the higher priority, and grants the process with the higher priority access. In this case, that is process P1.

Figure 7:
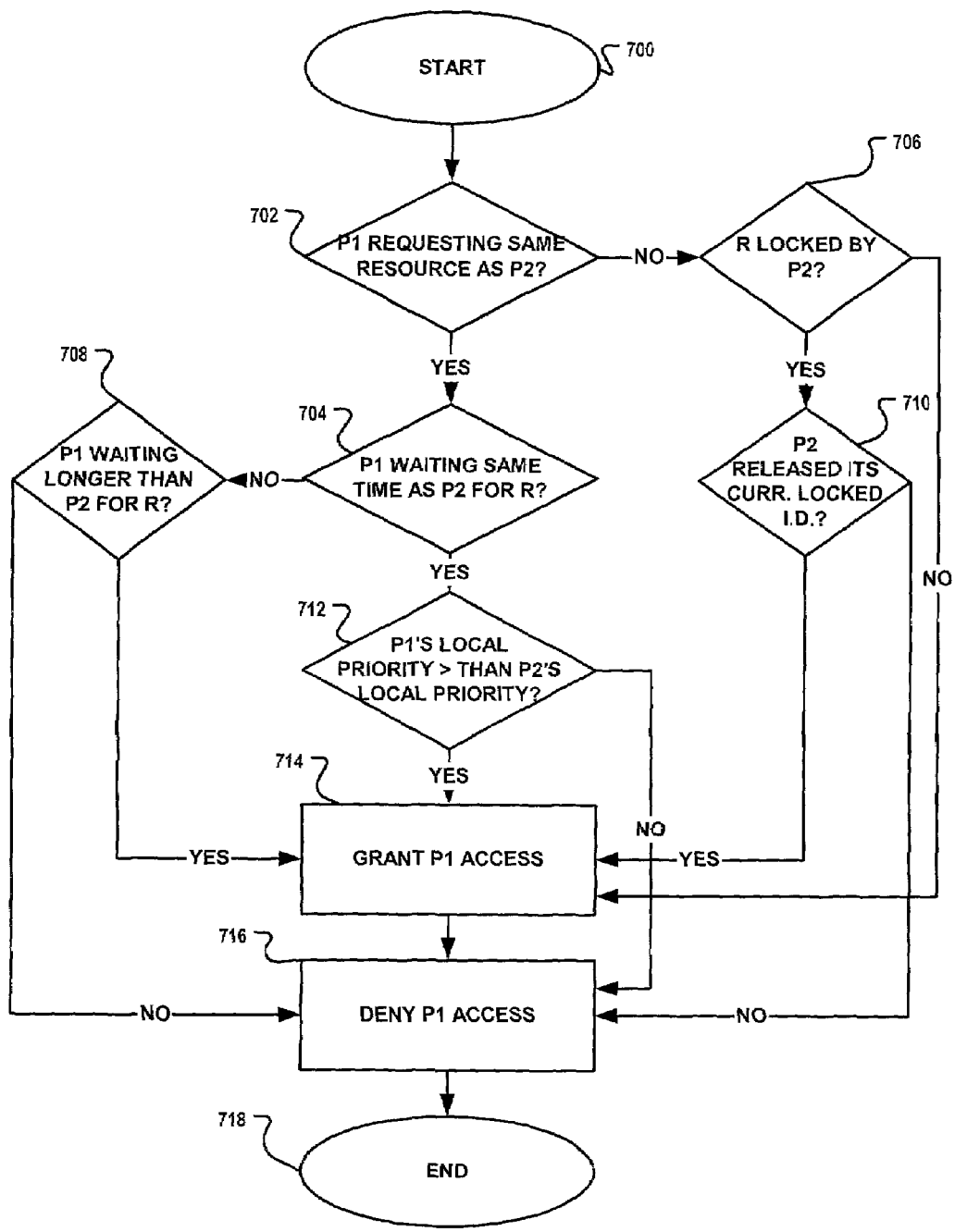
FIG. 7 is a flowchart illustrating a method for using the self-contained semaphore system of FIG. 6.

A method illustrating this embodiment is illustrated in the flowchart of FIG. 7. The method for a process P1's semaphore system begins at block 700 and continues to block 702 where it is determined if there is a conflict between process P1 and process P2 over a resource R. If there is a conflict, then it is determined whether P1 and P2 have been waiting an equal amount of time at block 704. If there is no conflict, then it is determined if the resource is locked by process P2 at block 706.

If there is a conflict, and P1 and P2 have been waiting an equal amount of time, it is determined if P1's local priority is greater than P2's local priority at block 712. If P1's local priority is greater than P2's local priority, then access is granted to P1 at block 714. Otherwise access is denied to P1 at block 716.

If there is a conflict, and P1 and P2 have not been waiting an equal amount of time, it is determined if P1 has been waiting longer for the resource R than P2 at block 708. If P1 has been waiting longer than P2 for resource R, then access to resource R is granted to P1 at block 714. Otherwise, access to resource R is denied to P1 at block 716.

If there is no conflict, then it is determined if the resource R is locked by P2 at block 706, and if P2 has released its lock on R at block 710. If R is locked by P2, and P2 has released its lock on R, then access to resource R is granted to P1 at block 714. If R is locked and P2 has not released its lock on R, then PI is denied access to R at block 716. If there is no conflict, and the resource R is not locked by P2, then access to resource R is granted to P1 at block 714. The method ends at block 718.

System Having Global Arbiter

Figure 8:
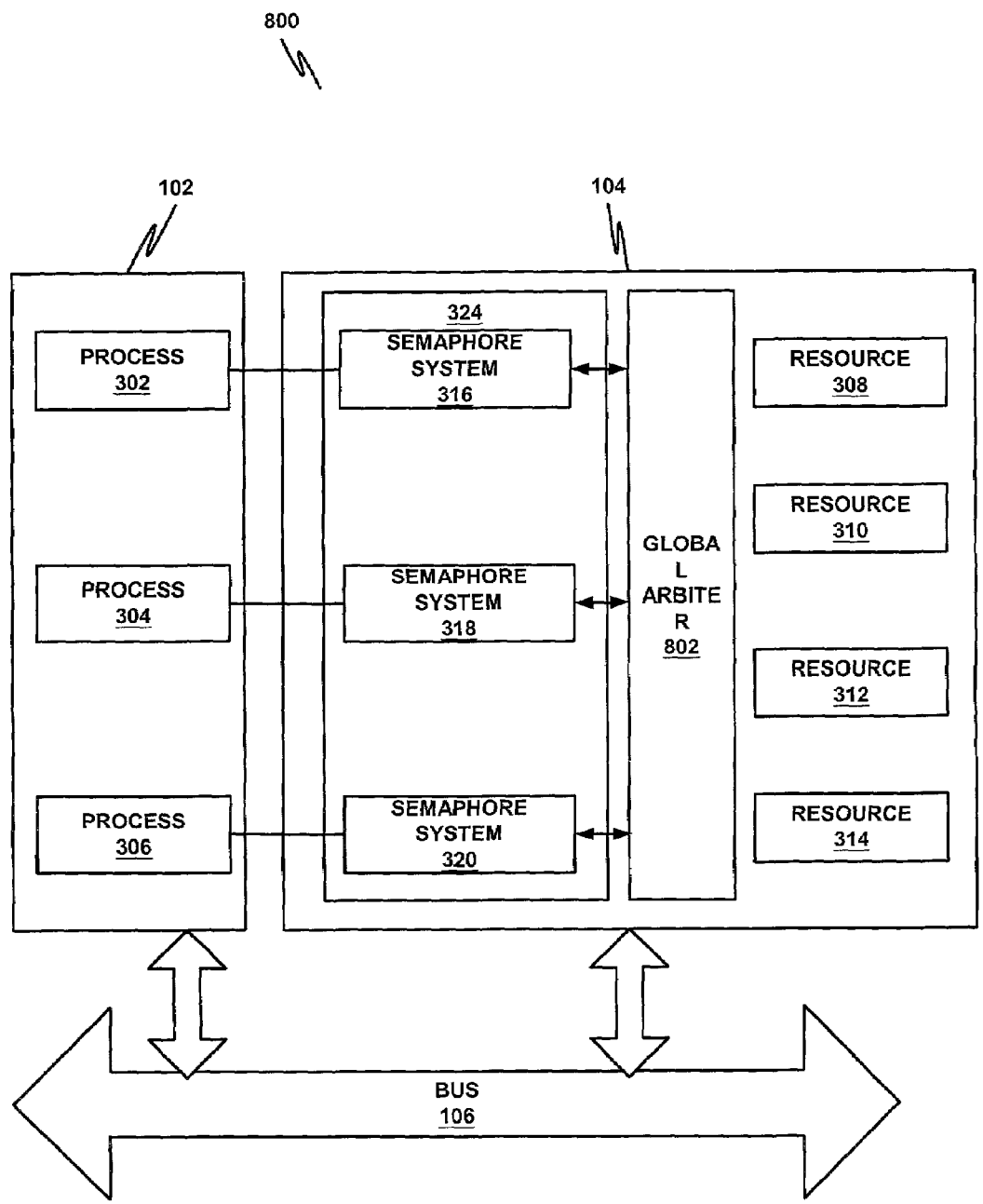
FIG. 8 is a block diagram illustrating a system having semaphore system that interacts with a global arbiter in accordance with embodiments of the invention.

In another embodiment of the invention, as illustrated in FIG. 8, the system 800 comprises a CPU having a plurality of processes 302, 304, 306, and a memory comprising a plurality of resources 308, 310, 312, 314, and a plurality of processes 302, 304, 306. In the system 300, each process 302, 304, 306 has a corresponding semaphore system 316, 318, 320 for managing shared access to the resources 308, 310, 312, 314. Alternatively, a single semaphore system 324 can be shared by all processes. Additionally, the system 800 comprises a global arbiter 802 for resolving conflicts.

In the descriptions below, processes 302, 304, semaphore systems 316, 318, and resource 308 are depicted to illustrate the arbitration process for two processes and their corresponding semaphore systems for a given resource 308. However, one of ordinary skill in the art would understand that the descriptions apply process 306, semaphore system 320, and resource 310, 312, 314, and any other processes, semaphore systems, and resources that may be defined, but are not illustrated or discussed herein.

Figure 9:
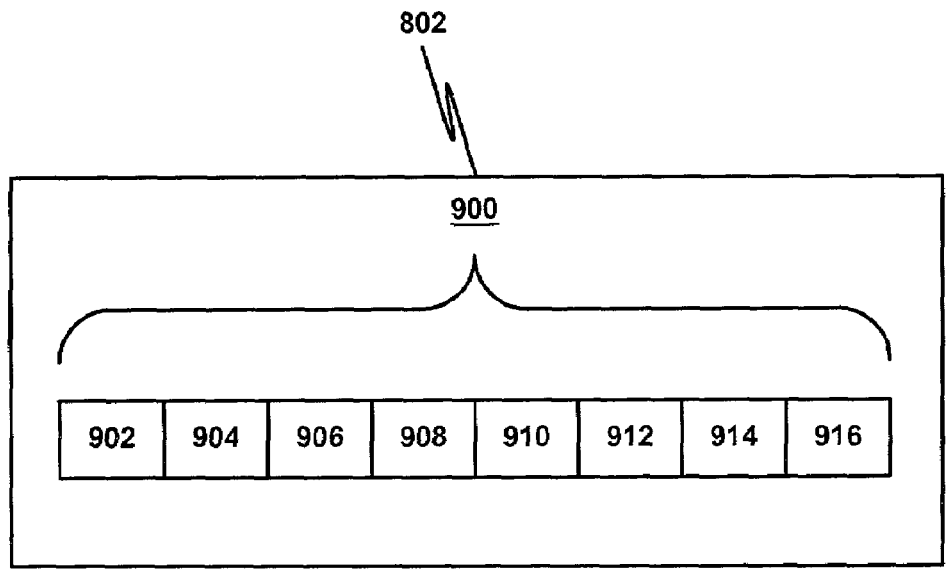
FIG. 9 is a block diagram illustrating a global priority queue of the global arbiter of FIG. 8.

As illustrated in FIG. 9, a global arbiter 802 may comprise a queue 900 (hereinafter "global priority queue") having entries 902, 904, 906, 908, 910, 912, 914, 916 where each entry corresponds to a priority, and each entry value indicates a unique process. (Alternatively, each entry may correspond to a unique process, and the entry value indicates the priority of the process). Initially, each process is assigned to an entry in the queue having a priority value (where the entry value is the process identifier). As each process is granted access to a resource, it is moved to the bottom of the queue such that it has the lowest priority.

A global arbiter 802 may comprise one queue for all resources such that a first process P1 that is granted access over a second process P2 subsequently has lower priority than P2 for all resources, or the global arbiter 802 may comprise a plurality of queues each corresponding to a resource such that a first process P1 that is granted access over a second process P2 subsequently has lower priority than P2 for the given resource.

For purposes of illustration, the latter of the two implementations is discussed. However, it should be understood by one of ordinary skill in the art that either implementation will work.

Semaphore Comprising Local Arbiter Only

Figure 10:
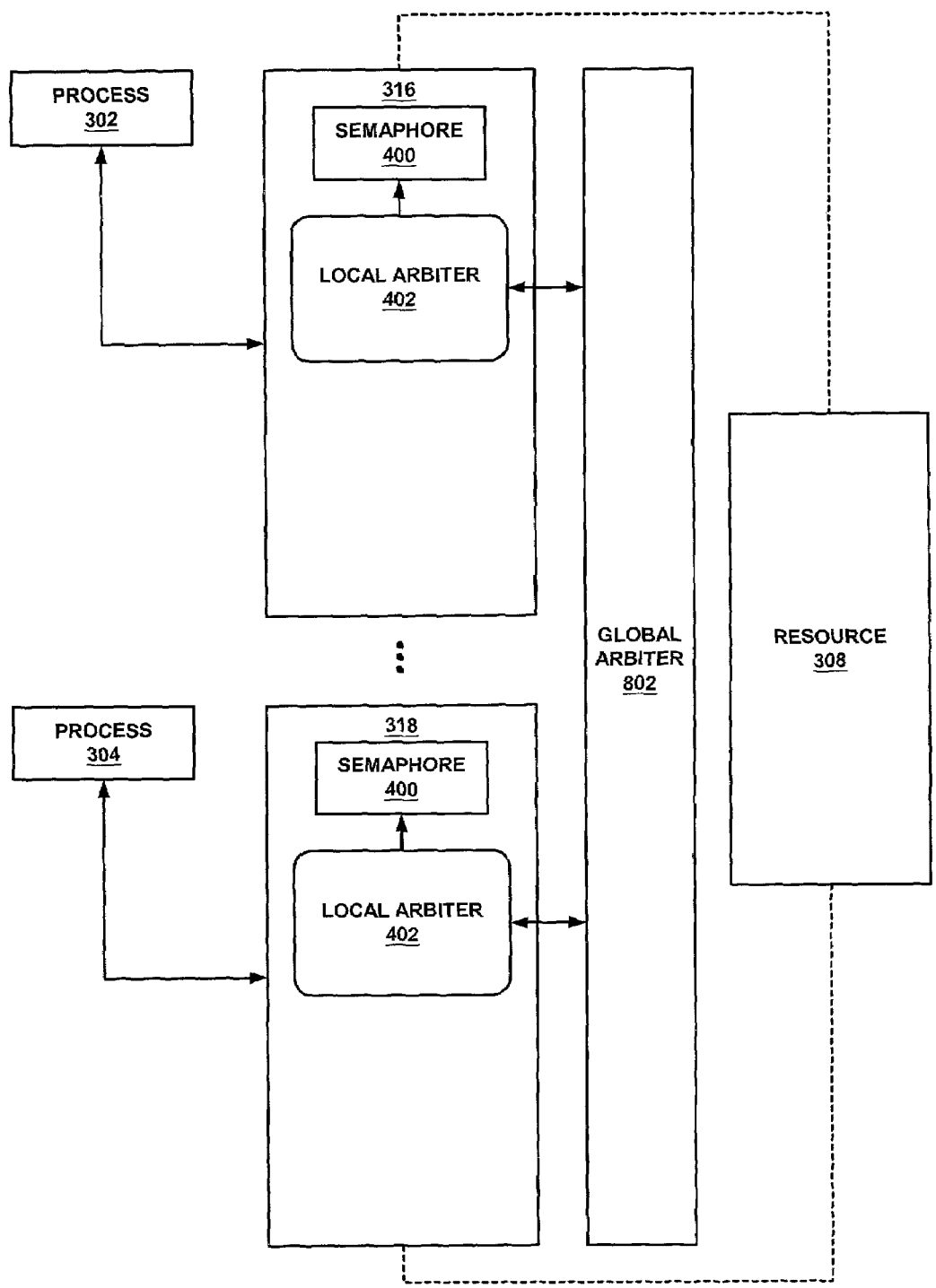
FIG. 10 is a block diagram illustrating a semaphore system that interacts with a global arbiter in one embodiment of the invention.

In one embodiment, as illustrated in FIG. 10, a semaphore system 316, 318 may comprise the local arbiter 402, and each process 302, 304 is assigned an initial priority in the global priority queue 900 of the global arbiter 802. The rankings change as the processes are granted access to the resource 308.

A local arbiter 402 for a first process communicates with a local arbiter 402 for a second process to determine if there is a conflict. If there is a conflict, the global arbiter 802 resolves the conflict by giving the resource to the process with the higher global priority as determined by its global priority queue 900. For example, if process P1 has a higher priority in the global priority queue than process P2, then if processes P1 and P2 simultaneously request a given resource R, then the global arbiter grants access to the resource R to P1.

Figure 11:
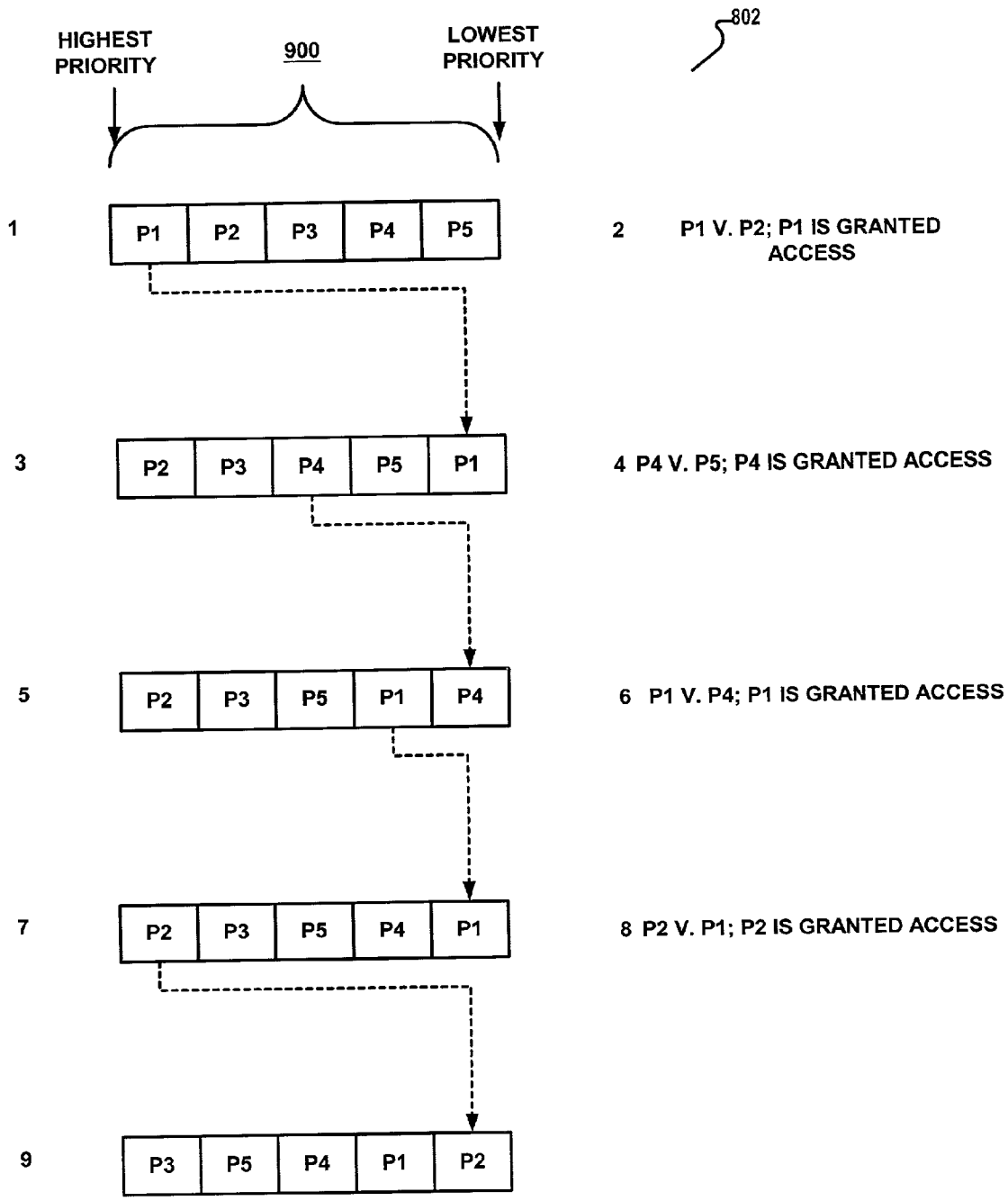
FIG. 11 is a sample flow diagram of how the global priority queue of the global arbiter in FIG. 8 operates.

An example is illustrated in FIG. 11, where five (5) processes P1, P2, P3, P4, and P5 are at one time or another competing for a given resource, R1. Assume that the global priority queue is initialized such that P1 has the highest priority and P5 initially has the lowest priority (step 1). At step 2, P1 and P2 compete for R1 at the same time. Since P1 has higher priority than P2, P1 is granted access and then moved to the bottom of the queue in step 3.

At step 4, P4 and P5 compete for R1. Since P4 has higher priority than P5, P4 is granted access and moved to the bottom of the queue in step 5. At step 6, P1 and P4 compete for R1. Since P1 has higher priority than P4, P1 is granted access and moved to the bottom of the queue at step 7. At step 8, P2 and P1 compete for R1. Since P2 has higher priority than P1, P2 is granted access and moved to the bottom of the queue. In this manner, it is apparent that fairness is achieved since processes that have not been granted access to R1 have higher priority than processes that have been granted access.

Figure 12:
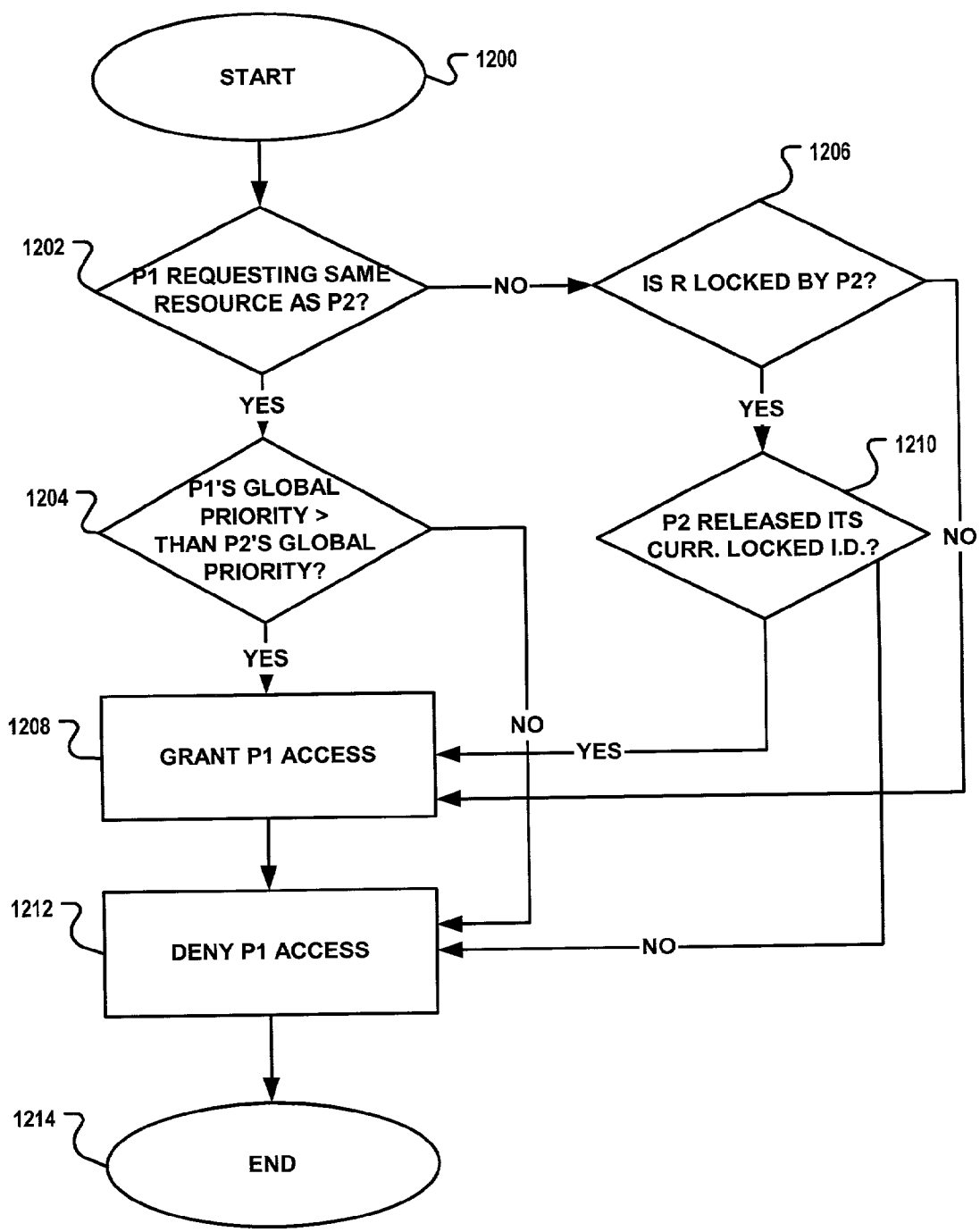
FIG. 12 is a flowchart illustrating a method for the semaphore system of FIG. 10.

The method discussed above is illustrated in the flowchart of FIG. 12. The method for a process P1's semaphore system begins at block 1200 and continues to block 1202 where it is determined if there is a conflict between process P1 and process P2 over a resource R. If there is a conflict, then it is determined if P1's global priority is greater than P2's global priority at block 1204. If P1's global priority is greater than P2's global priority, then access is granted to P1 at block 1208. Otherwise access is denied to P1 at block 1212.

If there is no conflict, then it is determined if the resource R is locked by P2 at block 1206, and if P2 has released its lock on R at block 1210. If R is locked by P2, and P2 has released its lock on R, then access to resource R is granted to P1 at block 1208. If R is locked and P2 has not released its lock on R, then P1 is denied access to R at block 1212. If there is no conflict, and the resource R is not locked by P2, then access to resource R is granted to P1 at block 1208. The method ends at block 1214.

Semaphore Comprising Local Arbiter and Timer Element

Figure 13:
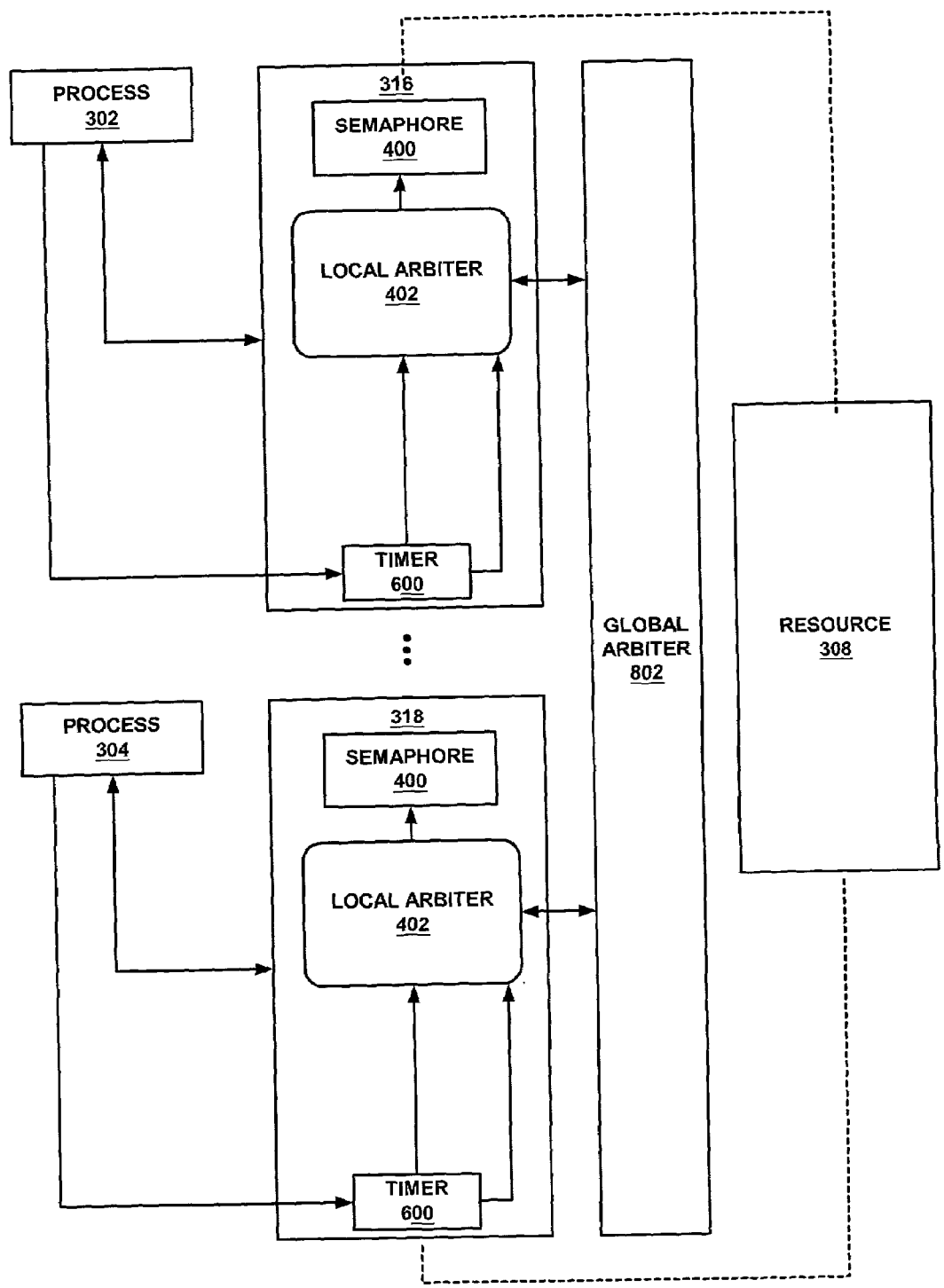
FIG. 13 is a block diagram illustrating a semaphore system having a timer element, and that interacts with a global arbiter in one embodiment of the invention.

In another embodiment, as illustrated in FIG. 13, a semaphore system 316, 318 may comprise the local arbiter 402 and a timer element 600 that keeps track of the time that its corresponding process has waited for a given resource without locking, supra. Additionally, each process is given an entry in the global priority queue 900 of the global arbiter 802.

When multiple processes request the same resource, the local arbiter 402 for a first process P1 of the multiple processes resolves a conflict between P1 and a second process P2 of the multiple processes, where P1 has higher priority than P2, as follows:

the local arbiter 402 will grant access to the process that has been waiting longer, as determined by the timer element 600;

if both processes have been waiting the same amount of time, then arbitration is offloaded to the global arbiter 802 to resolve the conflict.

Once arbitration has been offloaded to the global arbiter 802, the global arbiter 802 consults the global priority queue 900 to determine which one of the two processes 302, 304 has higher priority. The global arbiter 802 then grants access to the process 302, 304 having the higher priority.

Figure 14:
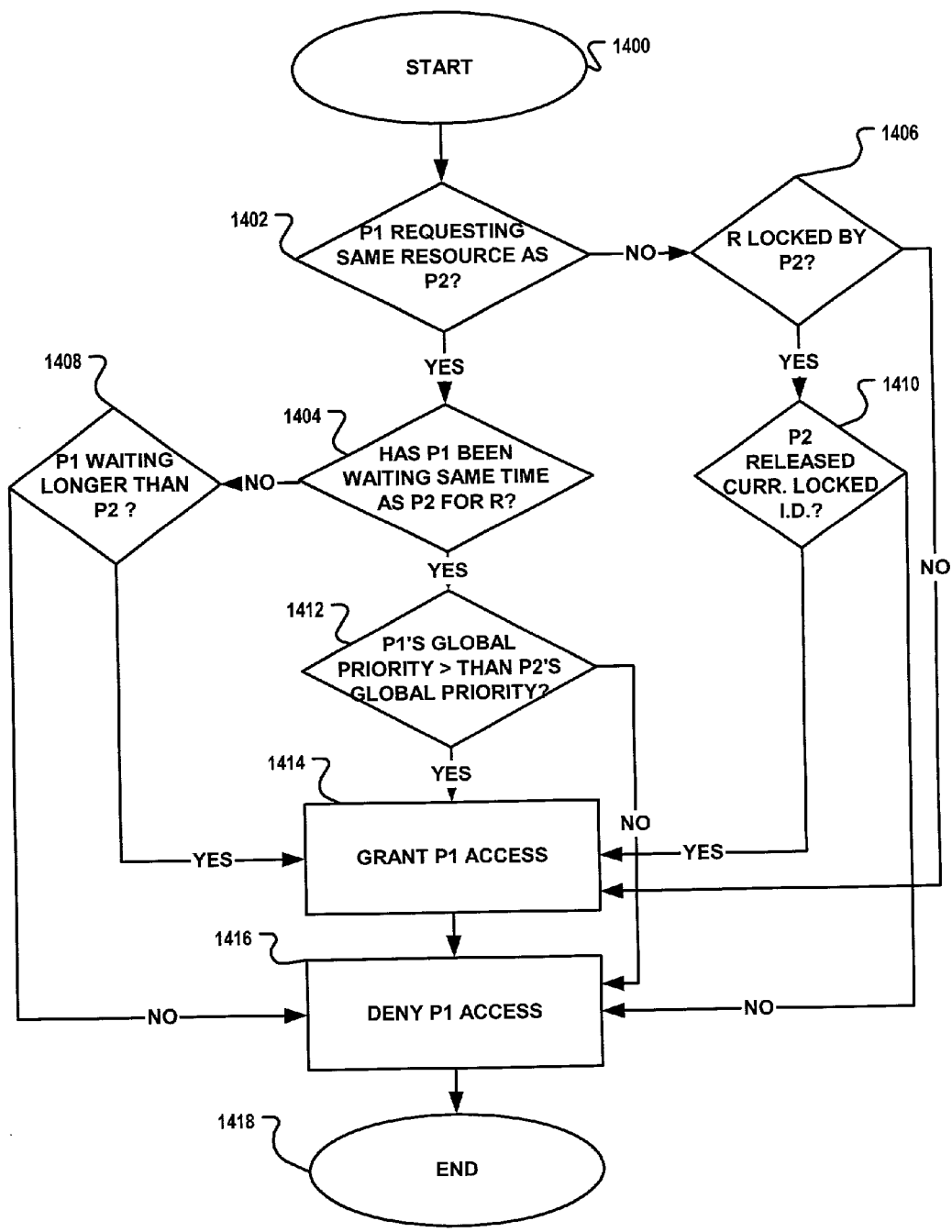
FIG. 14 is a flowchart illustrating a method for the semaphore system of FIG. 13.

FIG. 14 illustrates this process. The method for a process P1's semaphore system begins at block 1400 and continues to block 1402 where it is determined if there is a conflict between process P1 and process P2 over a resource R. If there is a conflict, then it is determined whether P1 and P2 have been waiting an equal amount of time at block 1404. If there is no conflict, then it is determined if the resource is locked by process P2 at block 1406.

If there is a conflict, and P1 and P2 have been waiting an equal amount of time, it is determined if P1's global priority is greater than P2's global priority at block 1412. If P1's global priority is greater than P2's global priority, then access is granted to P1 at block 1414. Otherwise access is denied to P1 at block 1416.

If there is a conflict, and P1 and P2 have not been waiting an equal amount of time, it is determined if P1 has been waiting longer for the resource R than P2 at block 1408. If P1 has been waiting longer than P2 for resource R, then access to resource R is granted to P1 at block 1414. Otherwise, access to resource R is denied to P1 at block 1416.

If there is no conflict, then it is determined if the resource R is locked by P2 at block 1406, and if P2 has released its lock on R at block 1410. If R is locked by P2, and P2 has released its lock on R, then access to resource R is granted to P1 at block 1414. If R is locked and P2 has not released its lock on R, then P1 is denied access to R at block 1416. If there is no conflict, and the resource R is not locked by P2, then access to resource R is granted to P1 at block 1414. The method ends at block 1418.

Figure 15:
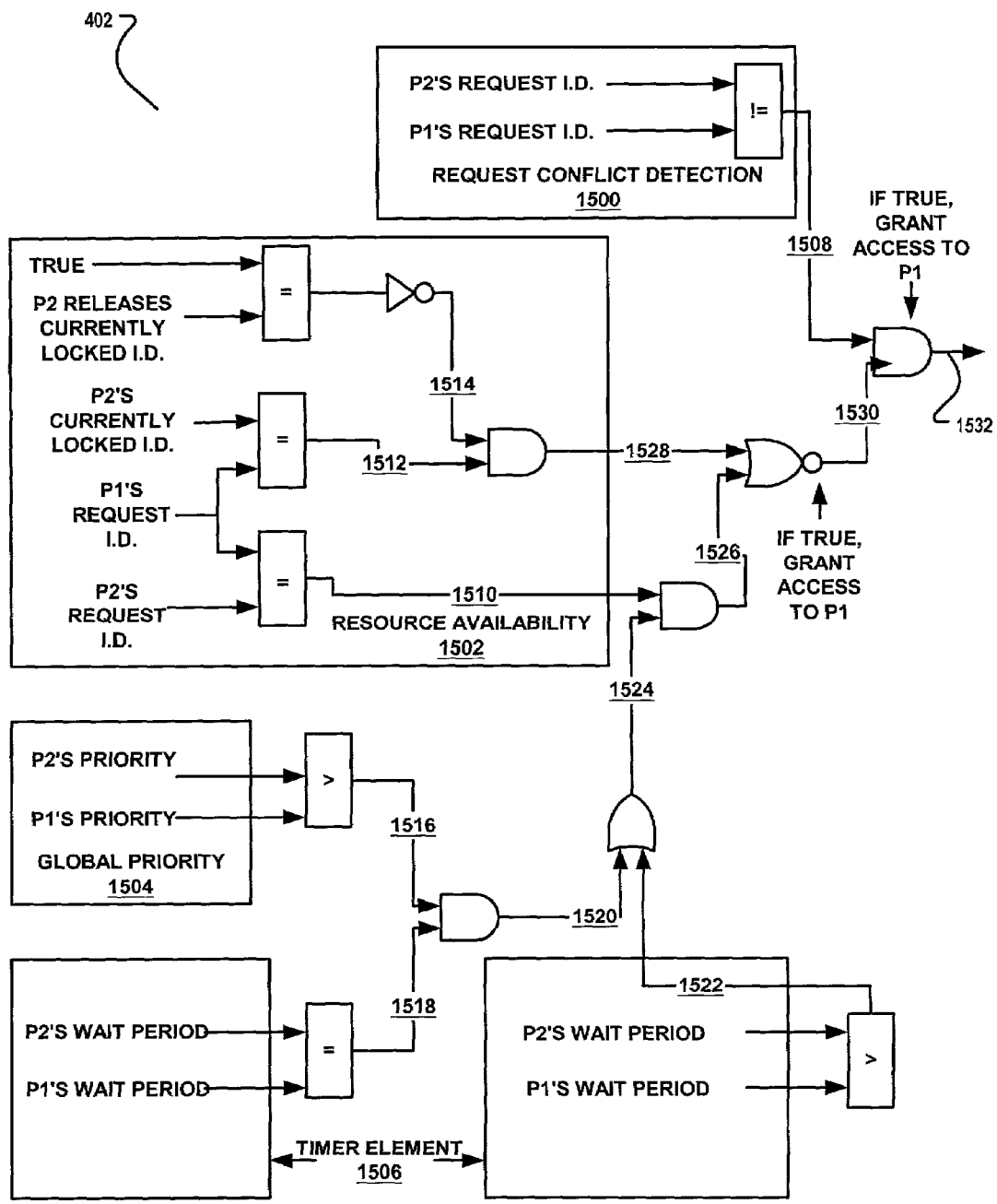
FIG. 15 is a block diagram illustrating a sample logic circuit for the semaphore system in accordance with general embodiments of the invention.

FIG. 15 is a basic circuit diagram for implementing a local arbiter 402 as described in embodiments of the invention. Elements 1500 and 1502 illustrate circuitry for determining whether any conflict exists. Element 1500 determines whether a first process P1 and a second process P2 are requesting the same resource R, and element 1502 determines if P1 is requesting a resource that P2 has locked. Element 1504 accepts input from the global priority block to determine which process has higher priority, and element 1506 accepts input from the timer element to determine which process has been waiting longer.

For example, for a local arbiter 402 corresponding to a process P1, access to a resource R will be granted if:

P1 does not request the same resource as P2, and P1 does not request a resource that P2 has locked. This is represented by the circuitry of FIG. 15 as follows:

If element 1532 is TRUE, then access to R is granted to P1. If element 1532 is FALSE, then access to R is denied to P1. Element 1532 is TRUE if both elements 1508 and 1530 are TRUE.

Element 1508 generates a TRUE signal if P1 and P2 are not requesting the same resource. Thus, if P1's request identifier does not equal P2's request identifier, then a TRUE signal is generated at element 1508.

Element 1530 generates a TRUE signal if both elements 1526 and 1528 generate a FALSE signal. Element 1528 generates a FALSE signal if either element 1512 or 1514 generates a FALSE signal. Thus, for example, element 1512 generates a FALSE signal if P1 does not request a resource that P2 has locked. Similarly, element 1526 generates a FALSE signal if either element 1510 or 1524 generates a FALSE signal. For example, element 1510 generates a FALSE signal if P1 does not request the same resource that P2 requests—in other words, this generates the opposite signal of element 1508.

P1 does not request the same resource as P2, P1 requests a resource that P2 has locked, but P2 releases that lock. This is represented by the circuitry as follows:

If element 1532 is TRUE, then access to R is granted to P1. If element 1532 is FALSE, then access to R is denied to P1. Element 1532 is TRUE if both elements 1508 and 1530 are TRUE.

Element 1508 generates a TRUE signal if P1 and P2 are not requesting the same resource. Thus, if P1's request identifier does not equal P2's request identifier, then a TRUE signal is generated at element 1508.

Element 1528 generates a FALSE signal if either element 1512 or 1514 generates a FALSE signal. Thus, for example, if element 1512 generates a TRUE signal instead (because P1 requests a resource that P2 has locked), then element 1514 must generate a FALSE signal. This occurs if P2 releases its currently locked identifier. Similarly, element 1526 generates a FALSE signal if either element 1510 or 1524 generates a FALSE signal. For example, element 1510 generates a FALSE signal if P1 does not request the same resource that P2 requests—in other words, this generates the opposite signal of element 1508.

P1 requests the same resource as P2, P1 is not requesting a resource that P2 as locked, (or if P1 has requested a resource that P2 has locked, then P2 has released that lock), and P1 has waited longer for the resource than P2. This is represented by the circuitry of FIG. 15 as follows:

If element 1530 is TRUE, then access to R is granted to P1. If element 1530 is FALSE, then access to R is denied to P1. Element 1530 is TRUE if both elements 1526 and 1528 are FALSE.

Element 1528 generates a FALSE signal if either element 1512 or 1514 generates a FALSE signal. Thus, for example, element 1512 generates a FALSE signal if P1 does not request a resource that P2 has locked. Also, if element 1512 generates a TRUE signal instead (because P1 requests a resource that P2 has locked), then element 1514 must generate a FALSE signal. This occurs if P2 releases its currently locked identifier.

Since element 1510 generates a TRUE signal if P1 has requested the same resource as P2, element 1526 generates a FALSE signal under the following circumstances. P1 and P2 have not been waiting the same amount of time, causing element 1518 to generate a FALSE signal, and therefore, causing element 1520 to generate a FALSE signal. Since P2 has not been waiting longer than P1, element 1522 generates a FALSE signal. Consequently, element 1524 generates a FALSE signal, and element 1526 generates a FALSE signal. As a result, element 1530 generates a TRUE signal, and P1 is granted access to R.

P1 requests the same resource as P2, P1 is not requesting a resource that P2 as locked, (or if P1 has requested a resource that P2 has locked, then P2 has released that lock), P1 has waited for the resource equally as long as P2, and P1's global priority is greater than P2's global priority. This is represented by the circuitry of FIG. 15 as follows:

If element 1530 is TRUE, then access to R is granted to P1. If element 1530 is FALSE, then access to R is denied to P1. Element 1530 is TRUE if both elements 1526 and 1528 are FALSE.

Element 1528 generates a FALSE signal if either element 1512 or 1514 generates a FALSE signal. Thus, for example, element 1512 generates a FALSE signal if P1 does not request a resource that P2 has locked. Also, if element 1512 generates a TRUE signal instead (because P1 requests a resource that P2 has locked), then element 1514 must generate a FALSE signal. This occurs if P2 releases its currently locked identifier.

Since element 1510 generates a TRUE signal if P1 has requested the same resource as P2, element 1526 generates a FALSE signal only if element 1524 generates a FALSE signal. P1 and P2 have been waiting the same amount of time, causing element 1518 to generate a TRUE signal. Since element 1518 is TRUE, element 1522 is necessarily FALSE. P2 does not have a higher priority than P1 so element 1516 is FALSE causing element 1520 to be FALSE. This causes element 1524 to be FALSE, and, therefore, element 1526. As a result, element 1530 generates a TRUE signal, and P1 is granted access to R.

CONCLUSION

Thus, an invention has been described for a semaphore system that is based on process events rather than on resource events. In one embodiment, the process event is a simple fixed priority. In another embodiment, the process event is a fairness-based dynamic priority.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   requesting access to a resource for a first process, the first process having a corresponding first semaphore that does not correspond to a particular resource;
   determining whether the resource is being accessed by a second process, the second process having a corresponding second semaphore that does not correspond to a particular resource; and
   denying the first process access to the resource if the resource is being accessed by the second process as indicated by a lock on the resource, wherein the lock is indicated at the second semaphore.

2. The method of claim 1, further comprising the first process having a corresponding first local priority and the second process having a corresponding second local priority.

3. The method of claim 1, further comprising:
   granting the first process access to the resource if the resource is not being accessed by the second process as indicated at the second semaphore.

4. A machine-readable medium, the machine-readable medium selected from the group consisting of a floppy diskette, an optical disk, a Compact Disc-Read Only Memory, a magneto-optical disk, a Read Only Memory, a Random Access Memory, an Erasable Programmable Read Only Memory, an Electromagnetic Erasable Programmable Read Only Memory, a magnetic card, an optical card, and a flash memory, the machine-readable medium having stored thereon data representing sets of instructions which, when executed by a machine, cause the machine to:
   request access to a resource for a first process, the first process having a corresponding first semaphore that does not correspond to a particular resource;
   determine whether the resource is being accessed by a second process, the second process having a corresponding second semaphore that does not correspond to a particular resource; and
   deny the first process access to the resource if the resource is being accessed by the second process as indicated by a lock on the resource, wherein the lock is indicated at the second semaphore.

5. The machine-readable medium of claim 4, further comprising the first process having a corresponding first local priority and the second process having a corresponding second local priority.

6. The machine-readable medium of claim 4, wherein the sets of instruction which, when executed by the machine, further cause the machine to:
   grant the first process access to the resource if the resource is not being accessed by the second process as indicated at the second semaphore.

7. An apparatus comprising:
   a processor to execute a plurality of processes including a first process and a second process; and
   a machine-readable medium having instructions stored thereon, which when executed cause the processor
   request access to a resource for the first process, the first process having a corresponding first semaphore that is does not have a corresponding resource;
   determine whether the resource is being accessed by the second process, the second process having a corresponding second semaphore that does not have a corresponding resource; and deny the first process access to the resource if the resource is being accessed by the second process as indicated by a lock on the resource, wherein the lock is indicated at the second semaphore.

8. The apparatus of claim 7, further comprising the first process having a corresponding first local priority and the second process having a corresponding second local priority.

9. The apparatus of claim 7, wherein the processor is further to grant the first process access to the resource if the resource is not being accessed by the second process as indicated at the second semaphore.

10. The method of claim 2, further comprising:
determining if access to the resource is simultaneously being requested by the second process; and
granting access to the resource to one of the first process and the second process having a higher local priority of the first local priority and the second local priority.

11. The machine-readable medium of claim 5, wherein the sets of instructions which, when executed by the machine, further cause the machine to:
determine if access to the resource is simultaneously being requested by the second process; and
grant access to the resource to one of the first process and the second process having a higher local priority of the first local priority and the second local priority.

12. The apparatus of claim 8, wherein the processor is further to:
determine if access to the resource is simultaneously being requested by the second process; and
grant access to the resource to one of the first process and the second process having a higher local priority of the first local priority and the second local priority.

13. A system comprising:
a memory having a plurality of resources being accessed by a plurality of processes, and a plurality of semaphores associated with the plurality of processes, wherein each of the plurality of semaphores do not correspond to any one particular resource; and
a processor coupled with the memory, wherein the processor is capable of executing the plurality of processes, the processor is further to;
request access to a resource for a first process of the plurality of processes, the first process having a corresponding first semaphore of the plurality of semaphores;
determine whether the resource is being accessed by a second process of the plurality of processes, the second process having a corresponding second semaphore of the plurality of semaphores; and
deny the first process access to the resource if the resource is being accessed by the second process as indicated by a lock on the resource, wherein the lock is indicated at the second semaphore.

14. The system of claim 13, further comprising the first process having a corresponding first local priority and the second process having a corresponding second local priority.

15. The system of claim 13, wherein the processor is further to grant the first process access to the resource if the resource is not being accessed by the second process as indicated at the second semaphore.

16. The system of claim 14, wherein the processor is further to:
determine if access to the resource is simultaneously being requested by the second process; and
grant access to the resource to one of the first process and the second process having a higher local priority of the first local priority and the second local priority.

17. A method comprising:
requesting access to a shared resource for a first process having a first corresponding semaphore system having a first priority, wherein the first semaphore system does not correspond to a particular resource;
determining if a second process having a second corresponding semaphore system having a second priority is also requesting access to the shared resource; and
if the second process is also requesting access to the shared resource, then granting access to one of the first and second processes having a higher priority.

18. The method of claim 17, wherein the first and second priorities comprise local priorities that are fixed for the respective first and second processes.

19. The method of claim 17, wherein the first process has a first wait time and the second process has a second wait time, and wherein granting access to said one of the first and second processes is based at least in part on a comparison of the first and second wait times.

20. The method of claim 17, wherein the first priority comprises a first global priority on a global priority queue of a global arbiter, and wherein the second priority comprises a second global priority on the global priority queue of the global arbiter.

21. An apparatus comprising:
a plurality of shared resources;
one or more circuits to perform a first process and a second process;
a first semaphore system including a first semaphore corresponding to the first process;
a second semaphore system including a second semaphore corresponding to the second process;
one or more arbiters to arbitrate for access to the plurality of shared resources for the first and second processes based at least in part on information in the first and second semaphore systems; and
the first semaphore system does not correspond to any one shared resource.

22. The apparatus of claim 21, wherein the one or more arbiters comprise:
a first local arbiter of the first semaphore system to arbitrate on behalf of the first process; and
a second local arbiter of the second semaphore system to arbitrate on behalf of the second process.

23. The apparatus of claim 21, wherein the one or more arbiters comprise a global arbiter.

* * * * *

UNITED STATES PATENT AND TRADEMARK OFFICE
CERTIFICATE OF CORRECTION

PATENT NO.       : 7,174,552 B2                                    Page 1 of 1
APPLICATION NO.  : 10/045414
DATED            : February 6, 2007
INVENTOR(S)      : Mikael et al.

It is certified that error appears in the above-identified patent and that said Letters Patent is hereby corrected as shown below:

Column 5, at line 47, delete "PI" and insert --P1--.

Column 10, at line 60, after "processor" insert --to--.

Column 12, at line 47, before the "the" insert --wherein--.

Signed and Sealed this

Twenty-fifth Day of December, 2007

JON W. DUDAS
*Director of the United States Patent and Trademark Office*